July 7, 1936. H. F. PHILLIPS 2,046,343
SCREW
Filed July 3, 1934

HENRY F. PHILLIPS.
INVENTOR.

BY James D. Givnan
ATTORNEYS.

Patented July 7, 1936

2,046,343

UNITED STATES PATENT OFFICE 2,046,343

SCREW

Henry F. Phillips, Portland, Oreg., assignor, by mesne assignments, to Phillips Screw Company, Wilmington, Del., a corporation of Delaware Application July 3, 1934, Serial No. 733,623

1 Claim. (Cl. 85—45)

This invention is directed to improvements in screws, and more especially to a type of screw particularly adapted to be actuated by the type of screw driver shown and described in my co-pending application filed concurrently herewith and entitled screw drivers. This present invention also comprehends improvements in any type of screw formed with a tool-engaging recess in one of its ends.

The invention comprises a punched recess, in the head of a screw, consisting entirely of a plurality of radially disposed tool-receiving grooves converging from the top surface of the screw head to a point on the longitudinal center line of the screw. The bottom walls of the grooves are flat, and taper, as aforesaid, to a common point of convergence, while the side walls, of the grooves, are angularly disposed with respect to each other and to their respective bottom walls. The side walls of each groove diverge in the direction of their length and merge into the walls of adjacent grooves.

The principal object of this invention is to provide a tool-receiving recess which may be formed in the head of a screw by a simple punching operation wherein the proper and equal displacement of the metal during such punching operation is an important factor, and wherein, also, the recess in its final form will embody a plurality of relatively wide and flat-bottomed grooves.

Another object of the invention is the provision of such grooves and side walls for the purpose of affording maximum bearing surfaces for a driver of corresponding configuration, and also to provide means for self-centering said driver with respect to the screw, this same means also acting as a positive lock and stabilizer between the screw and driver during all driving operations and under any load conditions imposed upon the screw either by a hand driver or by the power driven type of driver.

These and other objects will appear as my invention is more fully hereinafter described in the following specification, illustrated in the accompanying drawing, and finally pointed out in the appended claim, and as said invention broadly comprehends any screw constructed in accordance with my invention, it is apparent that I am not to be confined to any specific form or mere construction of device, inasmuch as a variety of modified mechanical structures may be adopted in embodying my said invention.

Figure 1:
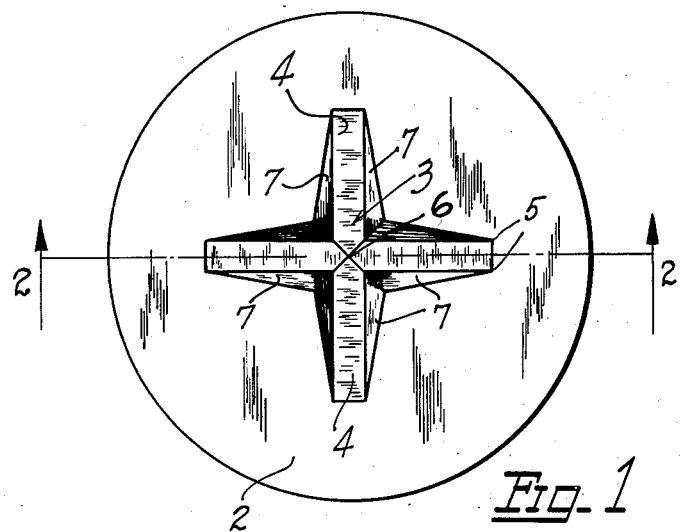
Figure 1 is a top plan view of a screw head provided with a tool-receiving recess formed in accordance with my invention.
Figure 2:
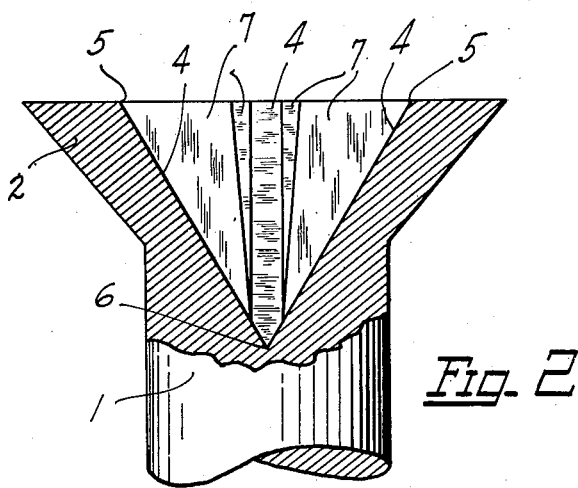
Figure 2 is a sectional side elevation of Figure 1, taken on the line 2—2 of Figure 1.

Referring now more particularly to the drawing:

The invention, as previously stated, may be readily applied to any type of screw, but for convenience of illustration, I have shown a flat head screw formed, as usual, with a shank 1 and a head 2. In the center of the head I form my new and improved tool-receiving recess, generally indicated at 3. More specifically, the recess comprises a plurality of intersecting grooves, as shown. Each groove is formed with a flat bottom wall 4, tapering downwardly from radially disposed points 5, to a common point of convergence 6 on the longitudinal center line of the screw. The side walls 7, of each groove, likewise originate at the radially disposed points 5, and increase in depth in the direction of their length in accordance with the depth or taper of the flat bottoms 4. The innermost edges of the walls of each groove merge, as shown, with the walls of the adjacent grooves. These side walls are likewise formed in angular relation to their bottom walls and diverge along their uppermost edges so that the merging line of adjacent walls will converge toward the point 6, heretofore referred to as the point of convergence of the bottom walls 4.

The angular relation of all the walls to each other, and particularly their angular relation with respect to the depth of the recess has been carefully calculated and determined in tests especially conducted to analyze the action of punches of various angular shapes in producing recesses of this particular type, and it has thus been found by experiment that a recess, substantially as shown, may be readily formed in the screw head by a simple punching operation, and that during such operation, the radial displacement of the metal will occur equally in all directions in accordance with the spreading action of the punch. This crowding or displacing action of the punch with the resultant compressing of portions of the screw head material, engenders a hardening of the metal which is an important feature of the invention, in that such hardening produces a head of much greater strength than heretofore possible.

While I have shown a particular form of embodiment of my invention, I am aware that many minor changes therein will readily suggest themselves to others skilled in the art without departing from the spirit and scope of my invention. Having thus described the invention, what I claim as new and desire to protect by Letters Patent, is:—

A screw having a head, a tool receiving recess formed in the head of the screw, said recess comprising a plurality of radially disposed tool receiving grooves, each groove comprising a bottom wall joining two side walls, the junction of said side walls with said bottom wall forming parallel corner edges, the said bottom walls of said grooves tapering toward each other and toward the longitudinal axis of the screw, and the said side walls of adjacent grooves intersecting along lines extending inwardly from points of origin on the surface of the screw head toward the longitudinal axis of the screw.

HENRY F. PHILLIPS.